United States Patent [19]

McGinn

[11] 4,357,629
[45] Nov. 2, 1982

[54] SYNC SEPARATOR WITH VARIABLE BIAS CONTROL
[75] Inventor: Michael McGinn, Tempe, Ariz.
[73] Assignee: Motorola, Inc., Schaumburg, Ill.
[21] Appl. No.: 220,611
[22] Filed: Dec. 29, 1980
[51] Int. Cl.³ .............................................. H04N 5/08
[52] U.S. Cl. ..................................................... 358/153
[58] Field of Search ................................ 358/148, 153
[56] References Cited
U.S. PATENT DOCUMENTS
2,601,191 6/1952 Wendt ............................ 358/153 X
2,950,342 8/1960 Revercomb ......................... 358/153

Primary Examiner—Robert L. Richardson
Attorney, Agent, or Firm—Charles R. Lewis

[57] ABSTRACT

A variable slicing level is provided for the sync pulse separator of a television (TV) receiver to enable proper sync signal separation from the video signal as the strength of the received signal changes. The automatic gain control (AGC) signal is used to vary the conduction of at least a single additional transistor to move the slicing level toward or away from the sync pulse tip depending upon the strength of the received signal.

10 Claims, 8 Drawing Figures

SYNC SEPARATOR WITH VARIABLE BIAS CONTROL

CROSS REFERENCE TO RELATED APPLICATIONS

1. Ser. No. 220,606, filed Dec. 29, 1980 "Horizontal Oscillator"
2. Ser. No. 220,604, filed Dec. 29, 1980 "Horizontal Phase Detector Gain Control"
3. Ser. No. 220,608, filed Dec. 29, 1980 "Horizontal Phase Lock Loop For Television"
4. Ser. No. 220328, filed Dec. 29, 1980 "Linear Full Wave Rectifier and Method for Providing Full Wave Rectified Signals"
5. Ser. No. 220,607, filed Dec. 29, 1980 "Large Scale, Single Chip Integrated Circuit Television Receiver Subsystem"
6. Ser. No. 220,609, filed Dec. 29, 1980 "Variable Capacitance Circuit"
7. Ser. No. 220,605, filed Dec. 29, 1980 "Crossover Circuit for Use in Automatic Gain Control Systems"
8. Ser. No. 220,329, filed Dec. 29, 1980 "Linear Full Wave Rectifier Circuit"
9. Ser. No. 220,610, filed Dec. 29, 1980 "Vertical Sync Counter Having Multi Modes of Operation For Different TV Systems"
10. Ser. No. 220,614, filed Dec. 29, 1980 "Integrator Circuit For Separating Vertical Sync Pulses"

BACKGROUND OF THE INVENTION

This invention relates to an improved circuit for separating the synchronizing pulses from a black and white or color composite video signal and, more particularly, to an improved sync separator circuit wherein the addition of a semiconductor element enables the slicing level of the sync separator circuit to be varied in accordance with the level of the automatic gain control (AGC) signal.

The image seen by a television camera and which is broadcast to a remote TV receiver is synchronized by horizontal and vertical synchronizing pulses which are included in the composite video/sound signal in a well known manner. The typical TV receiver first separates the sound from the received signal and then separates the synchronizing pulses from the video information. Since the maximum amplitude of the sync pulses is greater than the maximum amplitude of the video information, this separation is achieved by a switch, or sync separator, that is biased to a slicing level located between the maximum values of the sync pulses and video information. Video information and sync pulse voltage levels below the slicing level cause the switch to be open and therefore are not passed therethrough whereas sync pulse voltage levels above the slicing level cause the switch to be closed and are passed therethrough. As the characteristics of the composite signal received by the TV receiver varies, it is also desirable to vary the slicing level of the sync separator.

Accordingly, one object of this invention is to provide an improved sync separator circuit to provide a variable slicing level.

Another object of this invention is to provide an improved sync separator circuit having a variable slicing level by adding thereto at least one semiconductor device.

Still another object of this invention is to provide an improved sync separator circuit in which the automatic gain control (AGC) signal is used to vary the conduction of a semiconductor element to thereby vary the slicing level.

BRIEF DESCRIPTION OF THE INVENTION

Briefly described, these and other objects, features and advantages of the present invention are achieved in a sync separator system that includes separator means adapted to receive a signal containing synchronizing and other information. The synchronizing information has a maximum value that is different than the maximum value of the other information and the separator means is adapted to separate the synchronizing information from the other information by using a bias level having a value related to the difference in these maximum values. Control means also adapted to receive the signal containing synchronizing and other information provides a control signal which is related to the magnitude of said signal applied thereto. Bias control means includes at least one semiconductor device having at least one electrode adapted to receive the control signal and at least another electrode coupled to the separator means for altering the value of the bias level in response to the control signal controlling the magnitude of current flow in the semiconductor device.

BRIEF DESCRIPTION OF THE DRAWINGS

The present invention is described in detail hereinbelow in conjunction with the following drawings wherein like reference characters designate like or corresponding parts throughout the various drawings and wherein.

DESCRIPTION OF THE PREFERRED EMBODIMENT

Before embarking on a detailed discussion of the invention, it may be helpful to briefly review basic television principles. A complete TV picture appears on a TV screen thirty times per second. Between each picture, there is an interval during which the screen is dark. Each picture however, is not projected as a complete picture but is created by varying the brightness of a moving spot of light. That is, the TV picture tube contains an electron gun which generates an electron beam which moves very rapidly across a phosphor coated screen and, by changing its strength, different amounts of light are produced in different places. More exactly, the electron beam is focused into a fine point that moves from the upper left-hand corner in a straight, nearly horizontal line to the right side of the screen. After each movement from left to right, the beam intensity is reduced so that no light is produced during the return motion from right to left. After each line, the beam is moved down a little on the tube face. While the motion of the electron beam is called "scanning", the electronic actions involved are generally referred to a "sweeping" and we speak of a horizontal sweep frequency of approximately 15,750 cycles per second.

There must be some synchronization between the image seen by a remote television camera and that which is ultimately shown on the TV screen. If, for example, the TV receiver scans a picture in more or less than one-thirtieth of a second, the picture will appear to roll vertically. Thus, great care is taken to synchronize accurately the scanning of each line and frame. To achieve this, synchronizing signals are transmitted to the receiver with the sound and video information. In addition to providing signals which control the starting of each line, the edges of the picture must be blanked out to avoid any appearance of ragged edges, and the electron beam must turned off during the time in which it returns to its starting place. This return time is often referred to as the retrace or flyback period and is approximately 9 microseconds long for each line (the horizontal flyback), but is considerably longer for the period when the beam returns from the bottom to the top of the TV screen (the vertical flyback period).

Figure 1:
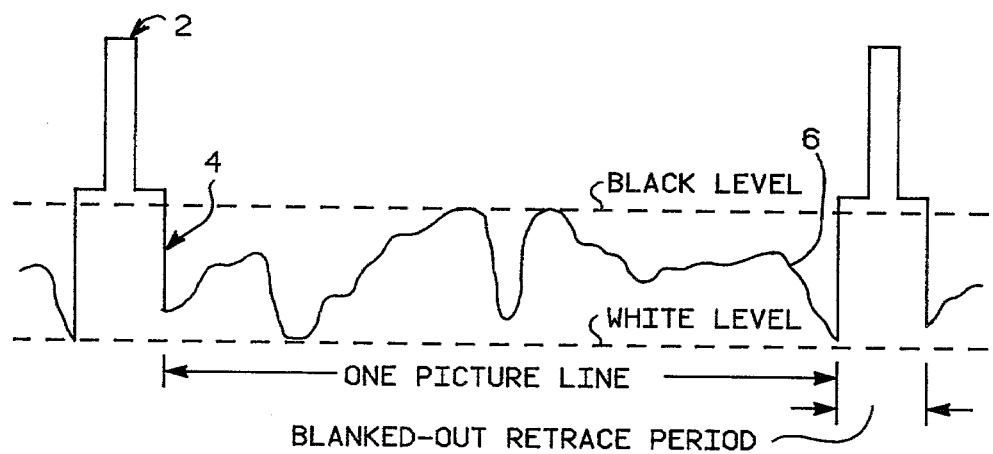
FIG. 1 illustrates an idealized demodulated TV signal including video signals and horizontal sync pulses.

FIG. 1 illustrates a black and white video signal including the horizontal synchronization pulses 2 and the horizontal blanking or flyback pulse 4. Interposed between successive flyback pulses is the actual black and white video signal 6 corresponding to one picture line. As can be seen, the horizontal flyback pulse 4 extends into the black region so that the edges of the picture are completely black avoiding the appearance of ragged edges.

Figure 2:
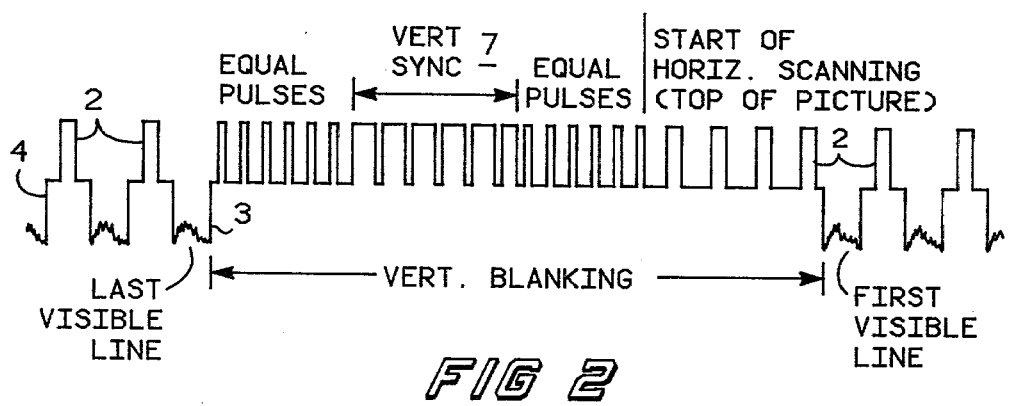
FIG. 2 illustrates an idealized demodulated TV signal including video signals horizontal sync pulses and vertical sync pulses.

Referring to FIG. 2, the start of each field of vertical scanning is dictated by a vertical synchronization pulse 7 which lasts much longer than the horizontal synchronization pulses 2. To avoid losing horizontal synchronization during the vertical flyback or blanking period, the horizontal synchronization pulses 2 are superimposed on the vertical blanking pulse 3. The first six pulses are very narrow and are referred to as equalizing pulses. Next, there are periods of six wide pulses which comprise the actual vertical synchronization pulse 7 serrated by the horizontal synchronization period. This is followed by an additional six equalizing pulses and then four regular horizontal synchronizing pulses 2 that start the top of the picture. Note that the vertical blanking period extends through this time and darkens the TV screen while the beam moves from bottom to top and covers the first four lines of the picture.

Figure 3:
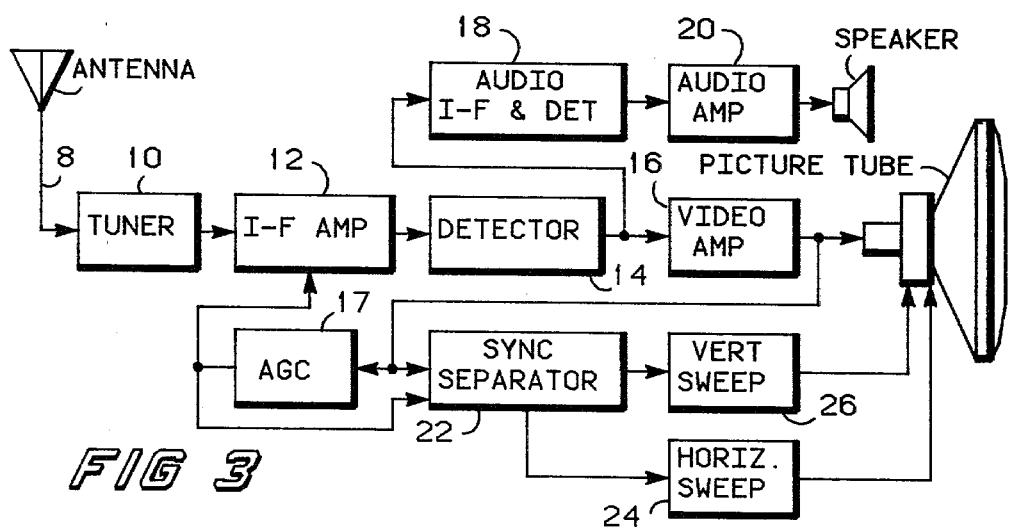
FIG. 3 illustrates a basic TV receiver in block diagram form.

FIG. 3 is a block diagram of a basic black and white TV receiver. From the antenna, a transmission line 8 brings all signals received by the antenna to a tuner 10 whose function it is to select the desired band of frequencies and reject all others. The tuner 10 passes only the desired signals to the IF amplifiers 12. To prevent loading and to minimize picture changes as the incoming signal varies in amplitude, automatic gain control (AGC) 17 is used to control the amplification of the IF signal.

The output of IF amplifiers 12 is applied to a detector 14 which removes the amplitude modulated video signal and applies it to video amplifier 16. The sound signal is removed, amplified, clipped, and limited in audio section 18. The output of audio detector 18 is applied to audio amplifier 20 which is similar to audio amplifiers found in radio receivers. The output of the audio amplifier is applied to a speaker.

Video amplifier 16 requires more bandwidth than audio amplifier 20. This is accomplished using special peaking circuits for the high and low frequency response. The output of video amplifier 16 is applied to the picture tube, to a sync separator 22 which is unique to television receivers and to the automatic gain control circuit 17 the outut of which controls the gain of the IF amplifier 12. In accordance with the present invention, the output of the automatic gain control circuit 17 is also applied to the sync separator 22. As described earlier, the horizontal 2 and vertical 7 synchronization pulses appear on top of their respective blanking signals 4 and 3 which are sandwiched in between lines of the picture signal. The sync separator 22 clips the horizontal 2 and vertical 7 synchronization pulses off of the composite video signal after the video signal has been amplified in video amplifier 16. Two separate filters may be employed in the sync separator 22 to then separate the vertical 7 from the horizontal 2 synchronization pulses. For example, a high pass filter would permit only the horizontal synchronization pulses to reach horizontal sweep section 24 while the vertical pulses could be passed through a low pass filter to the vertical sweep section 26.

The vertical sweep section 26 generates the actual signals which pass through the deflection yoke of the picture tube to move the electron beam up and down. Similarly, the horizontal sweep section 24 is responsible for moving the electron beam across the tube. In order to obtain the large current of short duration required in the horizontal deflection coils, a transformer is generally used. Furthermore, a flyback transformer is generally considered part of the horizontal sweep section. This transformer generates a high voltage during the time in which the electron beam returns from right to left.

Co-pending U.S. patent application Ser. No. 220,610, filed Dec. 29, 1980 entitled "Large Scale, Single Chip Integrated Circuit Television Receiver Subsystem" and filed of even date herewith describes a VLSI single chip black and white television receiver into which the inventive sync separator may be incorporated. It is understood, however, that the sync separator of the present invention can also be used in a color receiver that may or may not be fabricated with one or more integrated circuits.

Figures 4A, 4B, 4C:
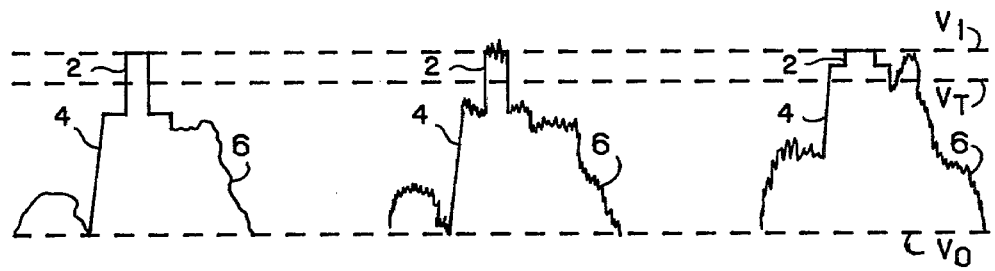
FIGS. 4A, 4B and 4C illustrate detected TV signals corresponding to various signal magnitudes received at the TV receiver.

FIG. 4A shows a portion of a typical demodulated composite video signal as having a maximum amplitude of V, at the tip of the horizontal sync pulses 2. The vertical sync pulses 7 (not shown in FIGS. 4A, 4B and 4C) also have the same maximum amplitude V. The horizontal blanking pulses 4 have a maximum amplitude located between zero volts and $V_1$.

The video signal 6 varies between zero volts and substantially to the maximum amplitude of the horizontal blanking pulses 4. The horizontal sync pulses 2 extend from the top of the horizontal blanking pulses 4 to $V_1$. FIG. 4B shows the signal when noise is present as is the case when the signal arriving at the TV receiver is relatively weak. FIG. 4C shows the sync pulse 2 crushed, i.e. reduced in total magnitude. If a sync separator had a slicing level of $V_t$ located substantially midway between the tip of the horizontal sync pulses 2 and the top of the horizontal blanking pulses 4, all of the signal below the level of $V_t$ would be blocked by the sync separator while all of the signal above the level of $V_t$ would be passed by the sync separator. This level $V_t$ is an optimum slicing level when the signal contains noise as shown in FIG. 4B and this level will effectively separate the horizontal 2 and vertical 7 sync pulses for a normal signal as shown in FIG. 4A. However, when the sync pulses 2 are crushed, as shown in FIG. 4C the horizontal blanking pulses 2 and video signal 6 may exceed the slicing level $V_t$ thereby causing erroneous sync signal outputs. This problem can be solved by the slicing level $V_t$ being located toward the tip of the sync pulses 2.

Figure 5:
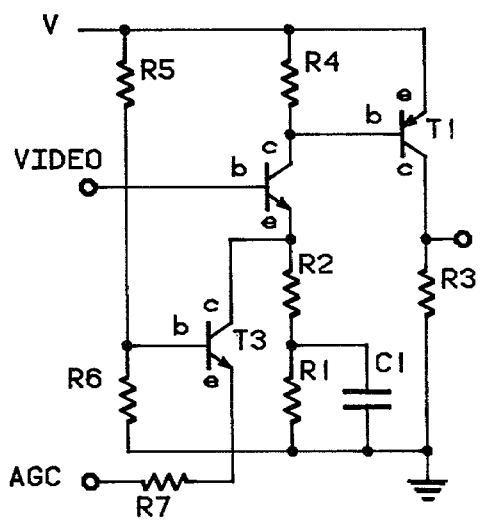
FIG. 5 illustrates an improved sync separator circuit according to the present invention.

An improved sync separator circuit having a variable slicing level in accordance with the present invention is shown in FIG. 5. Transistors T1 and T2, resistors R1, R2, R3 and R4, and capacitor C1 form a known sync separator circuit the operation of which is modified in accordance with the present invention by Transistor T3. Transistor T2 has its collector c coupled to a source of operating potential V by way of resistor R4, its base b coupled to receive a composite video signal such as illustrated in FIGS. 1, 2, 4A, 4B and 4C and its emitter e coupled to a reference potential, such as ground, by way of resistor R2 which is in series with the parallel combination of resistor R1, and capacitor C1. Transistor T2 comprises an amplifier switch that is open i.e. conducting, when the voltage magnitude on the base b exceeds a certain value $V_t$ and which is closed i.e. nonconducting, when the voltage magnitude on the base b falls below the certain value $V_t$. For example, when transistor T2 conducts during the occurrence of a vertical 7 or horizontal 2 sync pulse, capacitor C1 changes to the voltage drop across R1 to establish the slicing level $V_t$. When transistor T2 is not conducting because a sync pulse 2 or 7 is not present, the capacitor C1 tends to discharge through R1. However, the time constant of resistor R1 and capacitor C1 is large in comparison to the time between sync pulses 2 and 7 so that the voltage across the capacitor C1 changes very little between sync pulses 2 and 7 and provides a bias for transistor $T_2$ that keeps transistor $T_2$ cut off between sync pulses and which defines the slicing level $V_t$. The ratio of resistor R1 to resistor R2 is chosen to select the magnitude of the slicing level $V_t$ in the absence of conduction of transistor T3. In accordance with one embodiment of the present invention the ratio of resistors R1 and R2 provided a bias, in the absence of conduction of transistor T3, that sliced the vertical 7 and horizontal 2 sync pulses applied to the base b of transistor T2 toward the tips of the sync pulses 2 and 7 such that a crushed sync pulse condition did not provide an erroneous output. The separated sync pulses 2 and 7 outputted from transistor T2 are applied to an amplifier which includes transistor T1 having its emitter e coupled to a source of operating potential V, its base b coupled to the collector c of transistor T2 and its collector c coupled to a source of reference potential, such as ground, by way of resistor R3 with the separated sync pulses 2 and 7 appearing as an output at the junction of resistor R3 with the collector of transistor T1. Once the vertical 7 and horizontal 2 sync pulses are separated from the composite signal the vertical 7 and horizontal 2 sync pulses are separated from one another in a well known manner.

In accordance with the present invention the slicing level of transistor T2 is made to move away from the tip of the sync pulses 7 and 2 as the strength of the signal arriving at the TV receiver decreases. This is accomplished by the use of at least a single transistor T3 which has its collector c coupled to the junction of the collector c of transistor T2 with resistor R2, its base b coupled to a voltage divider which includes serially connected resistors R5 and R6, and its emitter coupled to receive the AGC signal provided by the gain control circuit 17 (FIG. 3) by way of a current limiting resistor R7. When transistor T3 is nonconducting it has no effect on the bias level of transistor T2. However, when transistor T3 is conducting, it permits the capacitor C1 to discharge further thereby moving the slicing level $V_t$ down and away from the tip of the sync pulses 2 and 7. Conduction of transistor T3, therefore, effectively reduces the resistance in the discharge path of the capacitor C1. The degree of conduction of transistor T3 determines how much the effective resistance is reduced and how far down the slicing level $V_t$ moves. In order to render transistor T3 conducting, the AGC voltage level appearing on the emitter c must be less that the magnitude of the bias voltage provided on the base b by the voltage divider resistors R5 and R6.

Figure 6:
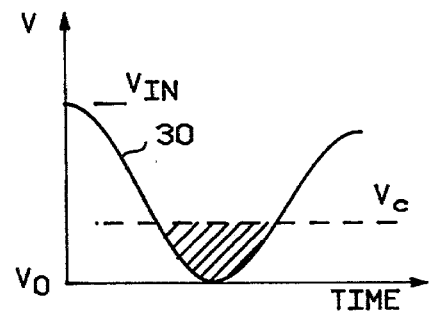
FIG. 6 illustrates various voltage levels used in the circuit shown in FIG. 5.

Curve 30 in FIG. 6 illustrates a typical AGC voltage. A strong signal arriving at the TV receiver causes the AGC voltage to be high and is a maximum at level Vm. This signal level causes the AGC voltage level appearing on the emitter c of transistor T3 to be greater than the bias level appearing on the base b and transistor T3 is nonconducting. As the signal arriving at the TV receiver decreases in strength, the AGC signal 30 magnitude will also decrease. Transistor T3 will remain nonconducting as long as the level of the AGC signal 30 is greater than the bias level on the base b. Further decreases in the strength of the received signal will further decrease the level of the AGC signal 30 until it is less than the bias level on the base b (level Vc in FIG. 6) thereby causing transistor T3 to conduct which results in lowering of the slicing level $V_t$. This continues until a very weak signal causes the AGC signal 30 level to be substantially zero volts at which time conduction of transistor T3 is at a maximum and the slicing level $V_t$ has been reduced to its lowest point. In accordance with one embodiment of the present invention, when the AGC signal level fell to substantially zero volts, conduction of transistor T3 caused the slicing level to be lowered to about the middle of the horizontal sync pulse 2 as shown in FIG. 4B which is the optimum slicing level for a signal having noise thereon.

With the possible exception of capacitor C1, the improved sync separator shown in FIG. 5 can be fabricated as part of an integrated circuit.

I claim:
1. A sync signal separator comprising:
separator means adapted to receive a signal containing synchronizing and other information;
said synchronizing information having a maximum value that is different than the maximum value of said other information;
said separator means adapted to separate said synchronizing information from said other information by using a bias level having a value related to the difference in said maximum values of said synchronous and said other information,
control means adapted to receive said signal for providing a control signal having a value related to the magnitude of said signal containing synchronizing and other information;
bias control means including at least one semiconductor device having one electrode adapted to receive said control signal, one electrode coupled to a reference potential and another electrode coupled to said separator means for altering the value of said bias level in response to said control signal controlling the magnitude of current flow in said semiconductor device, and current flow through said semiconductor device varying the bias level in said separator means between said maximum amplitudes with current flow through said semiconductor device being determined, at least in part, by said control signal, said semiconductor device conducting current only when the magnitude of said control signal differs from the magnitude of said reference potential by a predetermined polarity.

2. The separator according to claim 1 wherein said separator means includes a switch which is closed whenever the magnitude of said synchronous and/or other information differs from the magnitude of said bias level in one direction and which is open whenver the magnitude of said synchronous and/or other information differs from the magnitude of said bias level in the other direction.

3. The separator according to claim 2 wherein said switch includes a second semiconductor device having at least one electrode coupled to receive said synchronous and said other information and at least one electrode coupled to a time constant circuit that determines, at least in part, said bias level;

said time constant circuit also being coupled to said at least one electrode of said semiconductor device in said bias control means whereby current flow through said semiconductor device in said bias control means varies the time constant of said time constant circuit.

4. A sync signal separator comprising:

detector means having an input and an output with the input thereof adapted to receive a modulated signal containing synchronizing and other information to provide at the output of the detecting means the synchronous and other information separated from said modulated signal, said synchronous information having a maximum value that is different than the maximum value of the other information, control means coupled to the output of the detector means for providing a control signal having a value related to the amplitude of said modulated signal applied to said input of said detector means, separation means coupled to the output of said detecting means for separating said synchronizing information from said other information by using a bias level having a value between said maximum values of said synchronous and said other information, bias control means including a semiconductor device having an input adapted to receive said control signal and an output coupled to said separating means for altering the value of said bias level between said maximum values in response to said control signal and an electrode coupled to a reference potential, and current flow through said semiconductor device varying the bias level in said separator means between said maximum amplitudes and current flow through said semiconductor device determined at least in part, by said control signal, said semiconductor device conducting current only when the magnitude of said control signal differs from the magnitude of said reference potential by a predetermined polarity.

5. The separator according to claim 4 wherein said separator means includes a switch which is closed whenever the magnitude of said synchronous and/or other information differs from the magnitude of said bias level in one direction and which is open whenever the magnitude of said synchronous and/or other information differs from the magnitude of said bias level in the other direction.

6. The separator according to claim 5 wherein said switch includes a second semiconductor device having at least one electrode coupled to receive said synchronous and said other information and at least one electrode coupled to a time constant circuit that determines, at least in part, said bias level;

said time constant circuit also being coupled to said output of said semiconductor device in said bias control means whereby current flow through said semiconductor device in said bias control means varies the time constant of said time constant circuit.

7. A sync signal separator comprising:

amplifier means having an input and an output with said input adapted to receive a modulated signal containing synchronizing and other information and appearing on said amplifier output, detector means having an input and an output with the input thereof coupled to the output of said amplifier means for providing at the output of the detecting means the synchronous and other information separated from said modulated signal, control means coupled to the output of the detector means for providing a control signal having a value related to the magnitude of said modulated signal applied to said input of said amplifier means, said control signal coupled to said amplifier to means to control the gain thereof, separator means coupled to the output of said detector means for separating said synchronizing information from said other information by utilizing a bias level having a value related to the difference in said maximum amplitudes of said synchronous and said other information, and bias control means having an input adapted to receive said control signal and an output coupled to said separator means for altering the value of said bias level in response to said control signal, said bias control means including a semiconductor device having at least one electrode coupled to said separator means, at least one electrode coupled to said control signal and at least one electrode coupled to a reference potential, current flow through said semiconductor device varying the bias level in said separator means between said maximum amplitudes and current flow through said semiconductor device determined at least in part by said control signal, said semiconductor device conducting current only when the magnitude of said control signal differs from the magnitude of said reference potential by a predetermined polarity.

8. The separator according to claim 7 wherein said separator means includes a switch which is closed whenever the magnitude of said synchronous and/or other information differs from the magnitude of said bias level in one direction and which is open whenever the magnitude of said syncrhonous and/or other information differs from the magnitude of said bias level in the other direction.

9. The separator according to claim 8 wherein
said switch includes a second semiconductor device having at least one electrode coupled to receive said synchronous and other information and at least one electrode coupled to a time constant circuit that determines, at least in part, said bias level;
said time constant circuit also being coupled to said at least one electrode of said semiconductor device in said bias control means whereby current flow through said semiconductor device in said bias control means varies the time constant of said time constant circuit.

10. The sync separator according to claims 1, 4 or 7 wherein
said combination is incorporated in an integrated circuit.

* * * * *

UNITED STATES PATENT AND TRADEMARK OFFICE
CERTIFICATE OF CORRECTION

PATENT NO. : 4,357,629

DATED : November 2, 1982

INVENTOR(S) : Michael McGinn

It is certified that error appears in the above—identified patent and that said Letters Patent is hereby corrected as shown below:

Claim 2, line 19 of column 7, change "whenver" to

--whenever--.

Claim 7, line 31 of column 8, after "," insert

--said synchronous information having a maximum amplitude that is different than the maximum amplitude of the other information,--.

Claim 8, line 68 of column 8, change "syncrhonous" to

--synchronous--.

Signed and Sealed this

Eighth Day of March 1983

[SEAL]

Attest:

GERALD J. MOSSINGHOFF

Attesting Officer

Commissioner of Patents and Trademarks